June 15, 1965
W. C. WINGLER ETAL
3,189,772
COIL BOBBIN FOR AN ELECTRIC CLOCK
Filed Nov. 28, 1962
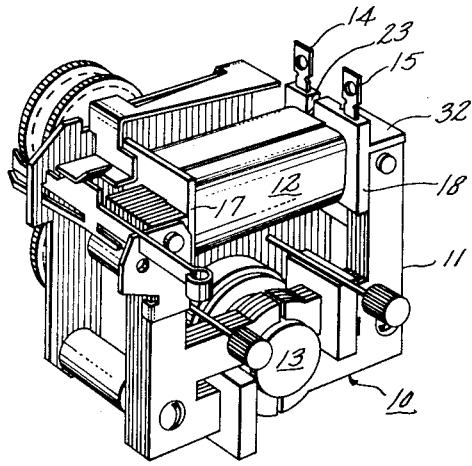
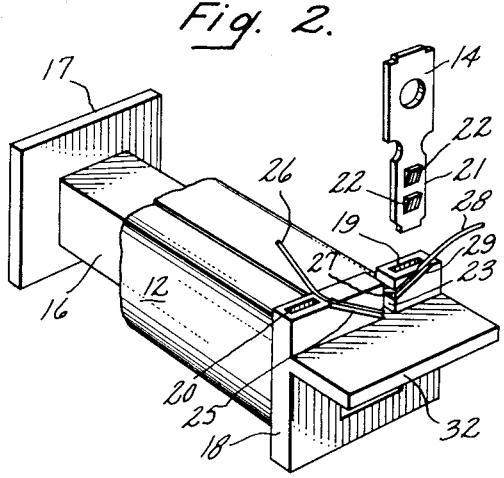
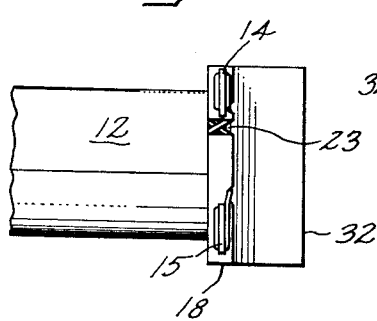
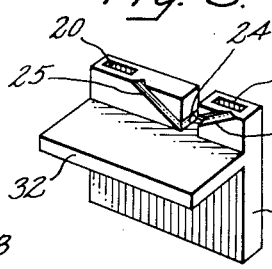
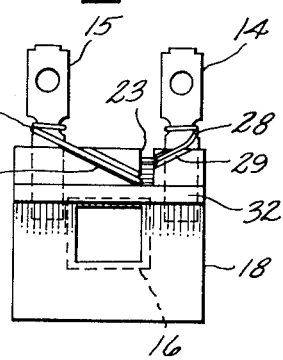
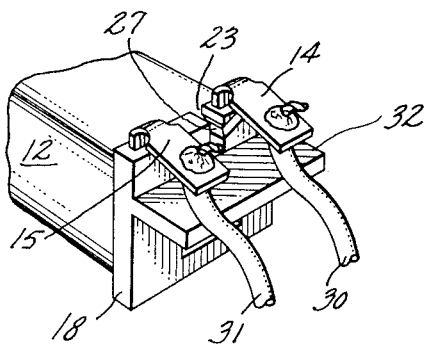
Inventors:
William C. Wingler,
Chester B. Marble,
by Lenard J. Platt
Their Attorney United States Patent Office 3,189,772
Patented June 15, 1965

3,189,772
COIL BOBBIN FOR AN ELECTRIC CLOCK
William C. Wingler, Northboro, and Chester B. Marble, Ashland, Mass., assignors to General Electric Company, a corporation of New York
Filed Nov. 28, 1962, Ser. No. 240,633
6 Claims. (Cl. 310—162)

This invention relates generally to an electric clock and, more particularly, to an improved coil bobbin for an electric clock.

The coil winding of a synchronous electric motor, as employed in an electric clock, is relatively fragile due to the fine diameter of the wire comprising the coil. Also, the wire is provided with a thin insulative coating which is susceptible to damage from abrasion or chipping. The terminal leads of the coil winding are especially susceptible to damage during manufacture. Since it is usually desirable to achieve compactness of the over-all clock mechanism, the individual elements of the clock mechanism are generally in close proximity to one another which further enhances the possibility of damage to the terminal leads due to the close working quarters.

Various safeguards have been proposed in the past but they generally involve additional structural elements which not only tend to defeat the objective of compactness but also tend to increase the cost of manufacture of the clock. For example, in order to properly insulate the start lead wire from the winding it is usually necessary to wrap a piece of tape around the start lead wire. It would be desirable to afford protection of the coil terminal leads without necessitating additional elements or manufacturing steps.

Another possible source of trouble in an electric clock lies in the coil terminals contacting the motor core. Here again, it would be advantageous to provide a safeguard to prevent this occurrence without necessitating additional manufacture.

It is an object of this invention to provide means in an electric clock to protect the coil lead wires from damage caused by abrasion without necessitating additional elements or manufacturing steps.

It is an object of this invention to provide means in an electric clock to prevent the coil terminals from contacting the motor core without necessitating additional manufacturing steps.

Briefly stated in accordance with one aspect of the invention, there is provided a hollow coil bobbin disposed about a portion of a core for a clock motor and adapted to receive a coil winding thereon. The bobbin is provided at one end with a flange having a pair of openings in the periphery thereof to receive, and secure to the flange, a pair of electrical terminals. A slot having first and second side walls extends through the flange in a direction generally parallel to the bobbin axis. A pattern of channels is provided in the flange to receive and thereby position and protect the lead wires extending from the coil to the aforementioned terminals.

While the specification concludes with claims particularly pointing out and distinctly claiming the subject matter which is regarded as the invention, it is believed the invention will be better understood from the following description taken in connection with the accompanying drawings, in which:

FIG. 1 represents a perspective view of an electrically-driven clock in which the invention has been incorporated;

FIG. 2 represents a perspective view of the coil bobbin incorporating the subject invention;

FIG. 3 represents a detailed perspective view of one flange of the coil bobbin;

FIG. 4 represents a fragmentary plan view of the coil bobbin represented in FIG. 2;

FIG. 5 represents an elevational view of the coil bobbin; and

FIG. 6 represents a fragmentary perspective view of the coil bobbin.

Referring to the drawings and particularly to FIG. 1, an electrically-driven clock mechanism 10 is shown. This mechanism includes a stator core 11 which may be of conventional laminated construction, an excitation winding 12, and a rotor and gear arrangement housed within casing 13. The excitation winding 12 is energized from an alternating current source by means of terminals 14 and 15. The remaining structural components of the clock mechanism do not form a part of the present invention and, therefore, are not described in detail.

Referring now to FIG. 2, wherein the excitation winding 12 is shown in greater detail, it can be seen that the excitation winding 12 includes a coil bobbin having a central portion 16 about which the coil wire of the excitation winding is wound. There is provided at one end of the central portion 16 a flange 17 and, at the other end, a flange 18. These flanges may be integrally molded with the central portion 16 or may be separate elements bonded thereto by any suitable means. Flanges 17 and 18 provide structural strength for the coil bobbin and also serve as a retaining means for the coil wire wound about the central portion.

Flange 18 serves the additional function of providing a support means for terminals 14 and 15. A pair of terminal-receiving openings 19 and 20 are provided in the periphery of flange 18 to assist in securing terminals 14 and 15, respectively, to the flange. Terminals 14 and 15 are identical to each other and, as can be seen in FIG. 2, terminal 14 has a reduced portion 21 which in turn has two bent-out tabs 22. Tabs 22 engage the side wall of opening 19 when terminal 14 is inserted therein to prevent withdrawal of terminal 14 from opening 19. Terminal 15 is secured in opening 20 in the identical manner.

In accordance with the invention, a slot 23 is provided in flange 18 and is disposed between the terminal-receiving openings 19 and 20. As best shown in FIG. 3, a channel 24 is provided in one side wall of the slot 23 and extends the entire thickness of flange 18. Channel 25, in the outer surface of flange 18, extends from a junction with channel 24 to the upper periphery of flange 18 near terminal-receiving opening 20. As seen in FIGS. 2, 4 and 5, channels 24 and 25 combine to form a passageway for the start lead wire 26 from the excitation winding 12 to the terminal 15. Channels 24 and 25 provide a positive positioning means for the lead wire 26 and, in addition, provide protection for the start lead wire in that the lead wire is recessed below the surface of the flange 18 so that a foreign object coming into contact with the flange 18 will be prevented from damaging the lead wire or the coating thereon. Thus, it can be readily seen that with this construction the uniquely formed flange effectively insulates the start lead wire, and the use of additional materials such as insulating tape is obviated.

A channel 27 is provided in the side wall of slot 23 opposite the side wall having slot 24. Slot 27 is disposed near the upper periphery of flange 18 to accommodate the end lead wire 28 of the excitation winding 12. At the outer surface of flange 18, channel 27 joins channel 29 which extends to the upper periphery of flange 18 near the terminal-receiving opening 19. Channels 27 and 29 combine to form a protective and positive positioning means similar to that described above with respect to channels 24 and 25.

As mentioned earlier, compactness is a virtue in the design of an electric clock. Accordingly, once the cord set wires 30 and 31, as shown in FIG. 6, are secured to terminals 14 and 15, the terminals may be bent over so as to consume less space. Problems have been encountered in the past when the terminals were forced into contact with the stator core 11 either through mishandling or misjudgment during the manufacturing processes. To overcome this problem the present invention provides a shelf-like projection 32 on the outer surface of flange 18 between terminals 14 and 15 and the stator core 11. The projection 32 may be integral with the flange 18 or may be a separate element secured thereto by any suitable means.

In the preferred embodiment, the central portion 16, flanges 17 and 18, and shelf 32 are made of plastic and colded integrally in a one-step operation which includes the forming of slot 23, channels 24, 25, 27 and 29, and terminal-receiving openings 19 and 20.

As will be evident from the foregoing description, certain aspects of the invention are not limited to the particular details of construction of the example illustrated, and it is contemplated that various and other modifications or applications will occur to those skilled in the art. It is therefore intended that the appended claims shall cover such modifications and applications as do not depart from the true spirit and scope of the invention.

What is claimed as new and is desired to be secured by Letters Patent of the United States is:

1. An excitation winding for an electric clock motor comprising:
  (a) an electrically-insulative bobbin having a central portion and a flange at one end of the central portion,
  (b) a coil wound about said central portion,
  (c) said coil having lead wires extending therefrom to transmit electrical energy thereto,
  (d) a first terminal-receiving opening in the periphery of said flange,
  (e) a second terminal-receiving opening in the periphery of said flange spaced from said first terminal-receiving opening,
  (f) a transverse slot through said flange between said first opening and said second opening and having first and second side walls and a bottom wall,
  (g) a first channel disposed in the outer surface of said flange extending from said bottom wall toward said first terminal-receiving opening,
  (h) a second channel disposed in the outer surface of said flange extending from said slot toward said second terminal-receiving opening,
  (i) said channels adapted to receive and protect the lead wires extending from said coil.

2. An excitation winding for an electric clock motor comprising:
  (a) an electrically-insulative bobbin having a central portion and a flange at one end of the central portion,
  (b) a coil wound about said central portion,
  (c) said coil having lead wires extending therefrom to transmit electrical energy thereto,
  (d) a first terminal-receiving opening in the periphery of said flange,
  (e) a second terminal-receiving opening in the periphery of said flange spaced from said first terminal-receiving opening,
  (f) a transverse slot through said flange between said first opening and said second opening and having first and second side walls,
  (g) a first channel disposed in the surface of said first side wall of said slot,
  (h) a second channel disposed in the outer surface of said flange extending from said first channel toward said first terminal-receiving opening,
  (i) a third channel disposed in the surface of said second side wall of said slot, and
  (j) a fourth channel disposed in the outer surface of said flange extending from said third channel toward said second terminal-receiving opening,
  (k) said channels adapted to receive and protect the lead wires extending from said coil.

3. In an electric clock, the combination comprising:
  (a) a synchronous motor,
  (b) a stator core for said motor,
  (c) a hollow bobbin having a central portion surrounding a portion of said core,
  (d) said central portion having a flange at one end thereof,
  (e) a coil wound about said central portion,
  (f) at least one electrical terminal extending from the periphery of said flange, and
  (g) an electrically-insulative shelf-like projection extending outwardly from said flange between said terminal and said stator core for insulating said terminals from said stator core when said terminals are bent toward said stator core to provide a compact unit.

4. In an electric clock, the combination comprising:
  (a) a synchronous motor,
  (b) a stator core for said motor,
  (c) a hollow bobbin having a central portion surrounding a portion of said core,
  (d) a coil wound about said central portion and having lead wires extending therefrom to transmit electrical energy thereto,
  (e) a flange at one end of said bobbin,
  (f) a first terminal-receiving opening in the periphery of said flange,
  (g) a second terminal-receiving opening in the periphery of said flange spaced from said first terminal-receiving opening,
  (h) a transverse slot through said flange between said first opening and said second opening and having first and second side walls,
  (i) a first channel disposed in the surface of said first side wall of said slot,
  (j) a second channel disposed in the outer surface of said flange extending from said first chanel toward said first terminal-receiving opening,
  (k) a third chanel disposed in the surface of said second side wall of said slot, and
  (l) a fourth channel disposed in the outer surface of said flange extending from said third channel toward said second terminal-receiving opening,
  (m) said channels being adapted to receive and protect the lead wires extending from said coil.

5. The combination of claim 4 additionally comprising an electrically-insulative shelf-like projection extending outwardly from said flange between said terminal-receiving openings and said stator core for insulating said terminals from said stator core when said terminals are bent toward said stator core to provide a compact coil unit.

6. In an electric clock, the combination comprising:
  (a) a synchronous motor,
  (b) a stator core for said motor,
  (c) a one-piece molded plastic bobbin comprising:
    (aa) a central portion surrounding said core,
    (bb) a flange at one end of said central portion,
    (cc) a first terminal-receiving opening in the periphery of said flange,
    (dd) a second terminal-receiving opening in the periphery of said flange spaced from said first terminal-receiving opening,
    (ee) a transverse slot through said flange between said first opening and said second opening and having first and second side walls.
    (ff) a first channel disposed in the surface of said first side wall of said slot,
    (gg) a second channel disposed in the outer surface of said flange extending from said first channel toward said first terminal-receiving opening,
    (hh) a third channel disposed in the surface of said second side wall of said slot, and (ii) a fourth channel disposed in the outer surface of said flange extending from said third channel toward said second terminal-receiving opening, and (d) a coil wound about said central portion and having lead wires extending therefrom to transmit electrical energy thereto, (e) said channels of said bobbin adapted to receive and protect the lead wires extending from said coil.

References Cited by the Examiner

UNITED STATES PATENTS

| | | | |
|---|---|---|---|
| 1,895,776 | 1/33 | Stolp | 336—192 |
| 3,014,164 | 12/61 | Howenstine | 317—158 |
| 3,117,294 | 1/64 | Muszynski et al. | 336—192 |

MILTON O. HIRSHFIELD, *Primary Examiner.*